US011423310B2

(12) United States Patent
Rippel et al.

(10) Patent No.: US 11,423,310 B2
(45) Date of Patent: *Aug. 23, 2022

(54) DEEP LEARNING BASED ADAPTIVE ARITHMETIC CODING AND CODELENGTH REGULARIZATION

(71) Applicant: WaveOne Inc., Mountain View, CA (US)

(72) Inventors: Oren Rippel, Mountain View, CA (US); Lubomir Bourdev, Mountain View, CA (US)

(73) Assignee: WaveOne Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,921

(22) Filed: Jun. 9, 2021

(65) Prior Publication Data

US 2021/0295164 A1    Sep. 23, 2021

Related U.S. Application Data

(60) Continuation of application No. 16/918,405, filed on Jul. 1, 2020, now Pat. No. 11,062,211, which is a
(Continued)

(51) Int. Cl.
*G06N 3/08* (2006.01)
*G06N 20/00* (2019.01)
(Continued)

(52) U.S. Cl.
CPC ............... *G06N 3/08* (2013.01); *G06N 3/04* (2013.01); *G06N 20/00* (2019.01); *G06K 9/6232* (2013.01);
(Continued)

(58) Field of Classification Search
CPC ........ G06N 3/08; G06N 3/0454; G06N 20/00; H04N 19/91; H04N 19/13; H04N 19/149; H04N 19/18; H04N 19/48
See application file for complete search history.

(56) References Cited

U.S. PATENT DOCUMENTS 6,778,709 B1   8/2004   Taubman
8,582,899 B2   11/2013  Ikeda et al.
(Continued)

OTHER PUBLICATIONS

Antonini, M. et al., "Image Coding Using Wavelet Transform," IEEE Transactions on Image Processing, Apr. 1992, pp. 205-220, vol. 1, No. 2.
(Continued)

*Primary Examiner* — Boubacar Abdou Tchoussou
(74) *Attorney, Agent, or Firm* — Fenwick & West LLP

(57) ABSTRACT

A deep learning based compression (DLBC) system applies trained models to compress binary code of an input image to a target codelength. For a set of binary codes representing the quantized coefficents of an input image, the DLBC system applies a first model that is trained to predict feature probabilities based on the context of each bit of the binary codes. The DLBC system compresses the binary code via adaptive arithmetic coding based on the determined probability of each bit. The compressed binary code represents a balance between a reconstruction quality of a reconstruction of the input image and a target compression ratio of the compressed binary code.

20 Claims, 9 Drawing Sheets

Related U.S. Application Data division of application No. 15/439,895, filed on Feb. 22, 2017, now Pat. No. 10,748,062.

(60) Provisional application No. 62/458,749, filed on Feb. 14, 2017, provisional application No. 62/434,602, filed on Dec. 15, 2016, provisional application No. 62/434,600, filed on Dec. 15, 2016, provisional application No. 62/434,603, filed on Dec. 15, 2016.

(51) Int. Cl.

| | | |
|---|---|---|
| H04N 19/126 | (2014.01) | |
| H04N 19/167 | (2014.01) | |
| H04N 19/172 | (2014.01) | |
| H04N 19/196 | (2014.01) | |
| H04N 19/91 | (2014.01) | |
| H04N 19/44 | (2014.01) | |
| H04N 19/13 | (2014.01) | |
| H04N 19/149 | (2014.01) | |
| G06N 3/04 | (2006.01) | |
| G06K 9/62 | (2022.01) | |
| G06V 10/44 | (2022.01) | |
| G06V 10/75 | (2022.01) | |
| G06V 20/40 | (2022.01) | |
| G06V 20/52 | (2022.01) | |
| G06V 30/10 | (2022.01) | |
| G06V 30/194 | (2022.01) | |
| G06V 40/16 | (2022.01) | |
| G06T 5/00 | (2006.01) | |
| H04N 19/18 | (2014.01) | |
| H04N 19/48 | (2014.01) | |
| H04N 19/154 | (2014.01) | |
| H04N 19/33 | (2014.01) | |

(52) U.S. Cl.
CPC ......... *G06K 9/6256* (2013.01); *G06K 9/6263* (2013.01); *G06K 9/6274* (2013.01); *G06N 3/0454* (2013.01); *G06N 3/084* (2013.01); *G06T 5/002* (2013.01); *G06V 10/449* (2022.01); *G06V 10/454* (2022.01); *G06V 10/758* (2022.01); *G06V 20/46* (2022.01); *G06V 20/52* (2022.01); *G06V 30/10* (2022.01); *G06V 30/194* (2022.01); *G06V 40/172* (2022.01); *H04N 19/126* (2014.11); *H04N 19/13* (2014.11); *H04N 19/149* (2014.11); *H04N 19/154* (2014.11); *H04N 19/167* (2014.11); *H04N 19/172* (2014.11); *H04N 19/18* (2014.11); *H04N 19/197* (2014.11); *H04N 19/33* (2014.11); *H04N 19/44* (2014.11); *H04N 19/48* (2014.11); *H04N 19/91* (2014.11)

(56) References Cited

U.S. PATENT DOCUMENTS

| | | |
|---|---|---|
| 2011/0229048 A1 | 9/2011 | Ikeda et al. |
| 2016/0098633 A1 | 4/2016 | Min et al. |
| 2017/0083792 A1 | 3/2017 | Rodriguez-Serrano et al. |
| 2017/0118471 A1 | 4/2017 | Eslami |
| 2017/0264902 A1 | 9/2017 | Ye et al. |
| 2017/0316312 A1 | 11/2017 | Goyal et al. |
| 2018/0107925 A1 | 4/2018 | Choi et al. |
| 2018/0137389 A1 | 5/2018 | Mathieu et al. |
| 2018/0139458 A1 | 5/2018 | Wang et al. |
| 2018/0146199 A1 | 5/2018 | Horn et al. |
| 2018/0249158 A1 | 8/2018 | Huang et al. |
| 2019/0171936 A1 | 6/2019 | Karras et al. |
| 2019/0205606 A1 | 7/2019 | Zhou et al. |

OTHER PUBLICATIONS

Balle, J. et al., "End-to-End Optimized Image Compression," ICLR 2017, Mar. 3, 2017, pp. 1-27.
Balle, J. et al., "Variational Image Compression with a Scale Hyperprior," ICLR 2018, May 1, 2018, pp. 1-23.
Bottou, L. et al., "High Quality Document Image Compression with "DjVu"," Journal of Electronic Imaging, Jul. 1998, pp. 410-4258, vol. 7, No. 3.
Dang-Nguyen, D.-T. et al., "RAISE: A Raw Images Dataset for Digital Image Forensics," in Proceedings of the 6th ACM Multimedia Systems Conference, ACM, 2015, MMSys'15, Mar. 18-20, 2015, pp. 219-224.
Denton, E. L. et al., "Deep Generative Image Models Using a Laplacian Pyramid of Adversarial Networks," in Advances in Neural Information Processing Systems, Jun. 18, 2015, pp. 1486-1494.
Goodfellow, I. et al., "Generative Adversarial Nets." In Advances in Neural Information Processing Systems, 2014, pp. 2672-2680.
Haffner, P. et al., "DjVu: Analyzing and Compressing Scanned Documents for Internet Distribution," ICDAR 1999, 1999, pp. 1-4.
Hinton, G.E. et al., "Reducing the Dimensionality of Data with Neural Networks," Science, Jul. 28, 2006, pp. 504-507, vol. 313.
Isola, P. et al., "Image-to-Image Translation with Conditional Adversarial Networks," Nov. 22, 2017, pp. 1-17.
Kingma, D. et al., "ADAM: A Method for Stochastic Optimization," ICLR 2015, Jan. 30, 2017, pp. 1-15.
Ledig, C. et al., "Photo-Realistic Single Image Super-Resolution Using a Generative Adversarial Network," Nov. 21, 2016, pp. 1-19.
Mallat, S. G. "A Theory for Multiresolution Signal Decomposition: The Wavelet Representation," IEEE Transactions on Pattern Analysis and Machine Intelligence, Jul. 1989, pp. 674-693, vol. 11, No. 7.
Mathieu, M. et al., "Deep Multi-Scale Video Prediction Beyond Mean Square Error," ICLR 2016, Feb. 26, 2016, pp. 1-14.
Radford, A. et al., "Unsupervised Representation Learning with Deep Convolutional Generative Adversarial Networks," ICLR 2016, Jan. 7, 2016, pp. 1-16.
Rippel, O. et al., "Learning Ordered Representations with Nested Dropout," in International Conference on Machine Learning, Feb. 5, 2014, 11 pages.
Salimans, T. et al., "Improved Techniques for Training GANs," 30.sup.th Conference on Neural Information Processing Systems (NIPS 2016), Barcelona, Spain, in Advances in Neural Information Processing Systems, 2016, pp. 2226-2234.
Santurkar, S. et al., "Generative Compression," Jun. 4, 2017, pp. 1-10.
Shi, W. et al., "Real-Time Single Image and Video Super-Resolution Using an Efficient Sub-Pixel Convolutional Neural Network," the IEEE Conference on Computer Vision and Pattern Recognition (CVPR), 2016, pp. 1874-1883.
Suter, S.K. et al., TAMRESH—Tensor Approximation Multiresolution Hierarchy for Interactive Volume Visualization: Eurographics Conference on Visualization, 2013, vol. 32, No. 3. pp. 151-160.
Theis, L. et al., "Lossy Image Compression with Compressive Autoencoders," ICLR 2017, Mar. 1, 2017, pp. 1-19.
Thomee, B. et al., "YFCC100M: The New Data in Multimedia Research," Communications of the ACM, Feb. 2016, pp. 64-73, vol. 59, No. 2.
Toderici, G. et al., "Full Resolution Image Compression with Recurrent Neural Networks," ICLR 2017, Jul. 7, 2017, pp. 1-9.
Toderici, G. et al., "Variable Rate Image Compression with Recurrent Neural Networks," ICLR 2016, pp. 1-12.
United States Office Action, U.S. Appl. No. 15/439,895, dated Dec. 6, 2019, 10 pages.
Wallace, G.K., "The JPEG Still Picture Compression Standard," IEEE Transactions on Consumer Electronics, Feb. 1992, pp. xviii-xxxiv, vol. 38, No. 1.
Wang, Z. et al., "Image Quality Assessment: from Error Visibility to Structural Similarity," IEEE Transactions on Image Processing, Apr. 2004, pp. 600-612, vol. 13, No. 4.

(56) References Cited

OTHER PUBLICATIONS

Wang, Z. et al., "Multiscale Structural Similarity for Image Quality Assessment," In Conference Record of the Thirty-Seventh Asilomar Conference on Signals, Systems and Computers, 2004., IEEE, Nov. 9-12, 2003, pp. 1398-1402, vol. 2.

Wikipedia: Structural Similarity, Wikipedia.org, Last Edited Mar. 22, 2018, 7 pages, [Online] [Retrieved on Apr. 10, 2018] Retrieved from the Internet<URL:https://en. wikipedia.org/wiki/Structural_similarity>.

United States Office Action, U.S. Appl. No. 16/918,405, dated Nov. 16, 2020, 9 pages.

United States Office Action, U.S. Appl. No. 16/918,436, dated Jan. 11, 2021, 10 pages.

Training AAC Module 225

Deployment of AAC Module 225

DEEP LEARNING BASED ADAPTIVE ARITHMETIC CODING AND CODELENGTH REGULARIZATION

CROSS REFERENCE TO RELATED APPLICATIONS

This application is a continuation application of U.S. patent application Ser. No. 16/918,405, filed on Jul. 1, 2020, which is a divisional application of U.S. patent application Ser. No. 15/439,895, filed on Feb. 22, 2017, which claims priority to Provisional U.S. Application No. 62/434,600, filed Dec. 15, 2016, Provisional U.S. Application No. 62/434,602, filed Dec. 15, 2016, Provisional U.S. Application No. 62/434,603, filed Dec. 15, 2016, and Provisional U.S. Application No. 62/458,749, filed Feb. 14, 2017. Each aforementioned application is incorporated herein by reference in its entirety.

BACKGROUND

This invention generally relates to presenting content, and more specifically to generating a progressive version of a digital media content, such as images and videos, using machine learning techniques.

Streaming of digital media makes a large portion of internet traffic with projections to reach an even higher portion by 2020. Existing approaches to digital media content compression such as image compression, however, have not been able to adapt to the growing demand and the changing landscape of applications. Compression of digital media content, in general, is to identify and reduce irrelevance and redundancy of the digital media content for compact storage and efficient transmission over a network. If the structure in an input (e.g., image or video) can be discovered, then the input can be represented more succinctly. Hence, many compression approaches transform the input in its original type of representation to a different type of representation, e.g., the discrete cosine transform (DCT), where the spatial redundancy of the input can be more conveniently exploited by a coding scheme to attain a more compact representation. However, in existing image compression approaches deployed in practice, the mechanisms for structure exploitation are hard-coded: for instance, JPEG employs 8×8 DCT transforms, followed by run-length encoding; JPEG 2000 applies wavelets followed by arithmetic coding, where the wavelet kernels used in the transform are hard-coded, and fixed irrespective of the scale and channel of input data.

Additionally, it is often desirable to send different client devices different bitrate versions of the same content, as a function of their bandwidths. Thus, a user of the client device can consume a version of the content that is best suited for the client device. However, this implies that for every target bitrate, the content must be re-encoded, and the corresponding code must be stored separately. Therefore, given the non-optimal nature of existing approaches to compression, having to re-encode the content for each target bitrate requires significant computational resources both for generating each compression and for continually maintaining and/or storing each generated compression

SUMMARY

A deep learning based compression (DLBC) system employs machine learning techniques, such as deep learning, in order to automatically discover structures of an input image or input video. As opposed to hard-coded techniques, enabling the automatic discovery of structures enables the more efficient representation of an input image. Namely, the encoded input image encoded through deep learning techniques achieves improved reconstruction quality and improved compression ratios as compared to conventional techniques. For example, one or more models can be trained once based on machine learning techniques, but the trained models can be applied to input images regardless of input image dimensions and desired target bit rate, and the one or more trained models are progressive with increased image reconstruction quality in response to increased available bits for compression.

In various embodiments, during a deployment phase, the DLBC system receives binary code bitplanes that correspond to quantized coefficients of an input image. The DLBC system applies trained models to the binary code bitplanes to compress the binary code to a target codelength via adaptive variable length arithmetic coding.

During a training phase, the DLBC system may train a model to predict feature probabilities based on the context of each bit of the binary codes. For example, the context of each bit includes the bitplane that the bit resides on and values of neighboring bits. Therefore, during the deployment phase, the DLBC system predicts the probability of each bit based on the predicted feature probabilities of the model.

Additionally, during the training phase, The DLBC system may train a different model that effectively generates the quantized coefficients of the input image. During training, the model receives feedback information that attempts to regularize the codelength of the compressed binary code to achieve a target compression. Namely, the DLBC system calculates a penalty for each quantized coefficient of the input image. In various embodiments, quantized coefficients that are large in magnitude in terms of their corresponding bitplanes and that deviate from neighboring quantized coefficients on a same bitplane are heavily penalized. Thus, when applied during the deployment phase, this trained model induces features in the extracted quantized coefficients, thereby enabling the DLBC system to improve the compression of the binary codes to achieve the target compression ratio.

Figure 1:
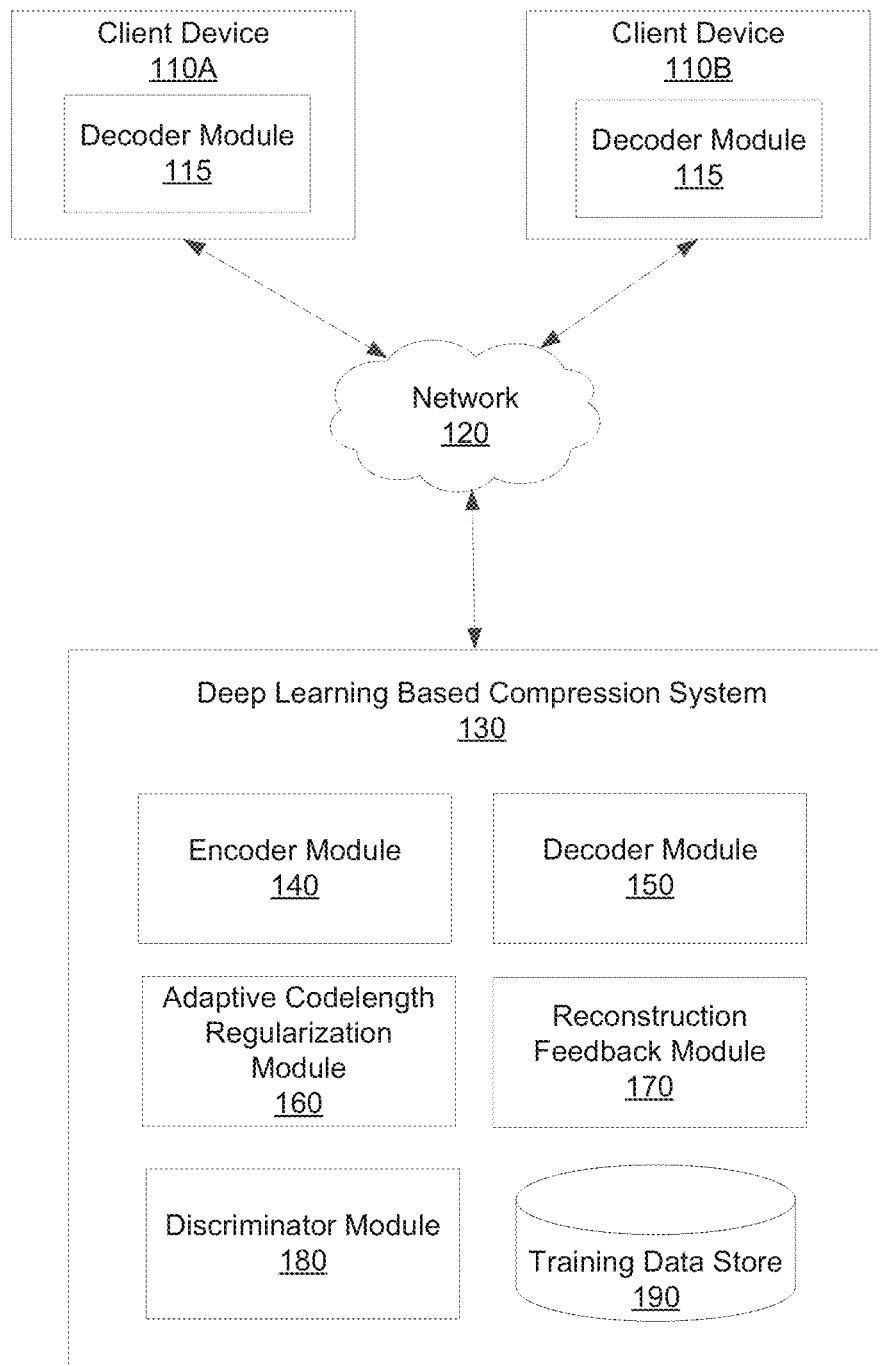
FIG. 1 is a block diagram of a system environment including a deep learning based compression system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

System Architecture

FIG. 1 is a block diagram of a system environment 100 including a deep learning based compression (DLBC) system 130, in accordance with an embodiment. Additionally, the system environment 100 includes one or more client devices 110. The DLBC system 130 encodes digital content, such as images or videos, and provides the compressed digital content to a client device 110.

The client device 110 is a computing device capable of receiving user input as well as transmitting and/or receiving data via the network 120. In one embodiment, the client device 110 is a conventional computer system, such as a desktop or a laptop computer. Alternatively, the client device 110 may be a device having computer functionality, such as a personal digital assistant (PDA), a mobile telephone, a smartphone or another suitable device. In various embodiments, specialized application software that runs native on a client device 110 is used as an interface to connect to the DLBC system 130. While FIG. 1 depicts two client devices 110, in various embodiments, any number of client devices 110 may communicate through the network 120 with the DLBC system 130. Different client devices 110 may have different characteristics such as different processing capabilities, different connection speeds with the DLBC system 130 and/or third party system 125 over the network 120, and different device types (e.g., make, manufacture, version).

In various embodiments, a client device 110 may include a decoder module 115 that is configured to decode content received through the network 120 from the DLBC system 130. In some scenarios, the decoder module 115 of the client device 110 receives instructions from the DLBC system 130 in order to appropriately decode the content. Therefore, once decoded by the decoder module 115, the client device 110 can appropriately playback and/or present the content for playback.

In various embodiments, a client device 110 may be configured to present information to and receive information from a user of the client device 110. For example, the client device 110 may include a user interface such as a display that the client device 110 uses to present content to the user. Therefore, a user of the client device 110 can provide user inputs through the user interface and the DLBC system 130 provides content to the client device 110 in response to the user input. As an example, a user input provided by a user through the user interface 112 of the client device 110 may be a request for particular digital content such as an image or video.

The DLBC system 130 encodes digital content, such as an image or video frames of a video, with a particular reconstruction quality and compression ratio or target bitrate. The DLBC system 130 will be hereafter described in reference to encoding an image; however, the descriptions may be similarly applied to a video. In various embodiments, the DLBC system 130 employs machine learning techniques to train models using feature vectors of positive training set and negative training set serving as inputs. In other embodiments, the inputs may be non-binary. The DLBC system 130 then applies the trained models to encode images. For example, a machine learning technique may be a convolutional network capable of unsupervised deep learning. Additionally, machine learning techniques employed by the DLBC system 130 include, but are not limited to, neural networks, naïve Bayes, support vector machines, short-term memory networks, logistic regression, random forests, bagged trees, decision trees, boosted trees and machine learning used in HIVE™ frameworks, in different embodiments. The trained models, when applied to the feature vector extracted from an input image, outputs an estimation of various structures of the input image across different input channels, within individual scales, across scales and the combination of thereof.

In various embodiments, the modules of the DLBC system 130 may train and fine-tune their respective machine learning models in stages, in different training spaces and dimensions. For example, a feature extraction model is trained, starting with training an easier model, e.g., for each scale of an input image, then using it as a starting point to train a more complicated model that has similar architecture to the easier model, e.g., a feature extraction model aligned to leverage information shared across different scales of the input image. The training can be conducted in a cascade where each model in the cascade is trained by fine-tuning a previous model within the cascade. Additionally, the models are trained on different learnable or training parameters. As a first example, the model is trained based on a bottleneck such as compressed binary codes subject to a bandwidth constraint. For example, the easier model is first trained on a large bottleneck, and more complicated models trained on decreasing sizes of the bottleneck. This reduction in the size of the bottleneck can be achieved by increasing the degree of quantization associated with binary tensor for generating the optimized compressed binary codes.

As another example, a machine learning model is trained based on an input image size. For example, an easier model can be trained on a smaller patch size of an input image (e.g., 64×64) and a second, more complicated model can be fine-tuned from the easier model for a larger patch size (e.g., 256×256). Other examples of training the machine learning models in stages include training based on a task such as training a first model on generic images and fine-tuning a second model based on the first model on targeted domains (e.g., faces, pedestrians, cartoons, etc.).

In the embodiment shown in FIG. 1, the DLBC system 130 includes an encoder module 140, a decoder module 150, an adaptive codelength regularization (ACR) module 160, a reconstruction feedback module 170, and a discriminator module 180. Furthermore, the DLBC system 130 includes a training data store 190 where the data used to train different machine learning models are stored. In various embodiments, the encoder module 140 and the ACR module 160 each train one or more machine learning models that are deployed when encoding an image. As described further herein, the process performed by the individual modules of the DLBC system 130 will be described as pertaining to a training phase or to a deployment phase. Specifically, the training phase refers to the training of one or more machine learning models by a module of the DLBC system 130. The deployment phase refers to the application of the one or more trained machine learning models.

Referring now to the individual modules, the encoder module 140 trains one or more machine learning models during the training phase that are then applied during the deployment phase to efficiently encode an image. The output of the encoder module 140 is hereafter referred to as compressed code.

To determine and improve the quality of the encoded image, the compressed code is provided to the decoder module 150 that performs the inverse operation of the encoder module 140 during the training phase. In other words, an input image encoded by the encoder module 140 can be subsequently decoded by the decoder module 150. In doing so, the decoder module 150 outputs what is hereafter referred to as a reconstructed input image. The reconstruction feedback module 170 compares the original input image to the reconstructed input image generated by the decoder module 150 to determine the extent of quality loss that occurred during the encoding process. As such, the reconstruction feedback module 170 provides the quality loss information as feedback. For example, the reconstruction feedback module 170 stores the quality loss information in the training data store 190 such that the machine learning models trained by the encoder module 140 can be further trained to improve the quality loss.

The discriminator module 180 uses generative adversarial network (GAN) approaches to improve the compression and reconstruction quality of input images. For example, the discriminator module 180 can train a model in parallel with the encoder module 140 such that the encoder module 140 can more efficiently encode the input image with higher quality.

To achieve a target compression ratio or target bit rate of the encoded image, the ACR module 160 may monitor the codelength of the compressed binary codes generated by the encoder module 140. The ACR module 160 may provide feedback to the encoder module 140 to adjust the trained models trained by the encoder module 140 in order to achieve a target codelength of the compressed binary codes. Further descriptions regarding each of the modules in the DLBC system 130 are described below.

In various embodiments, the system environment 100 may further include a third party system that can provide encoded content to one or more client devices 110. In this scenario, the DLBC system 130 may generate encoding technology (e.g., trained models) and provide it to a third party system such that the third party system can appropriately encode and/or decode content that are to be provided to one or more client devices 110.

Training Phase of the Autoencoding Process
Encoding Process

Figure 2A:
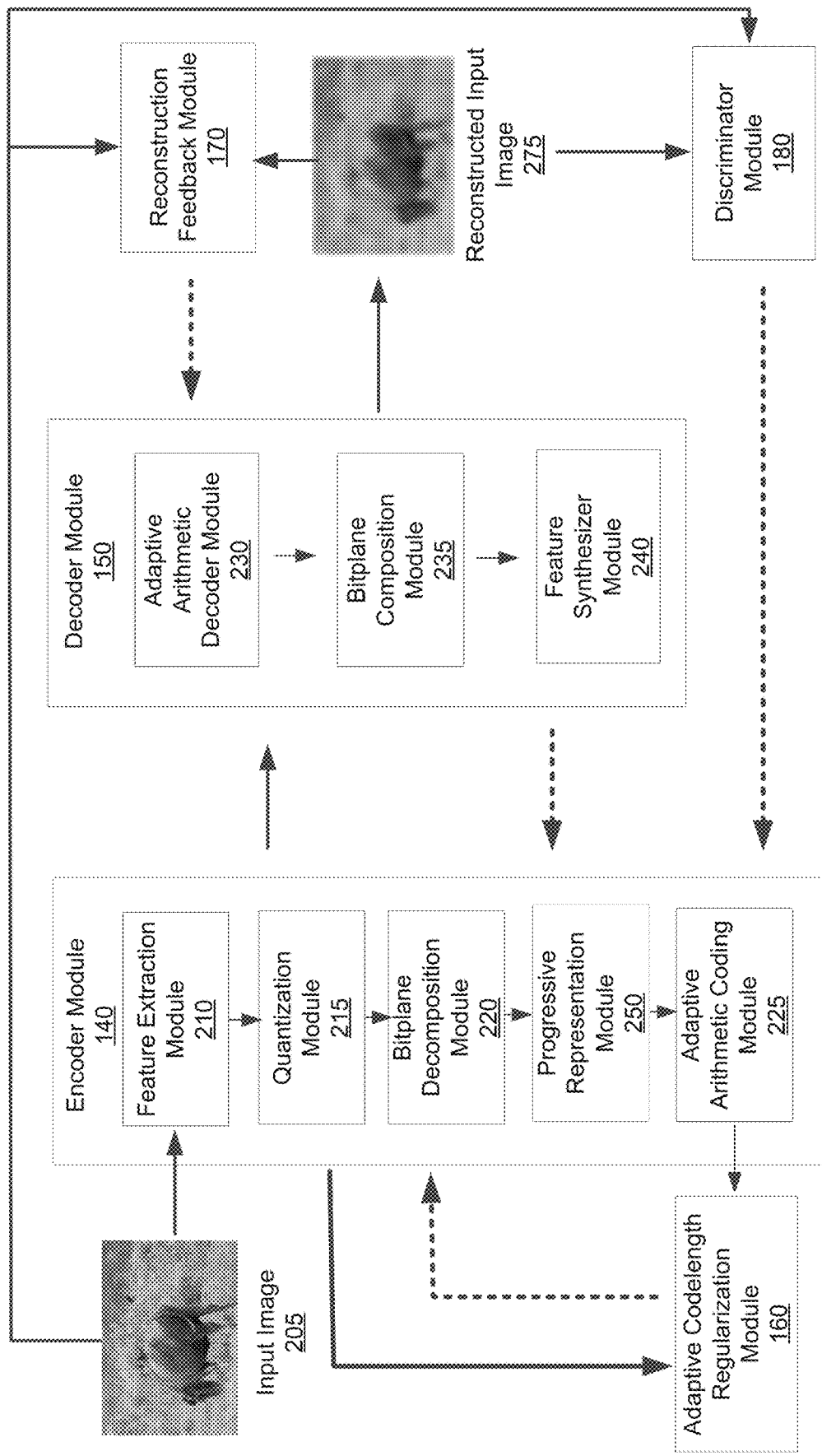
FIG. 2A is flow diagram of the architecture of the deep learning based compression system during the training phase, in accordance with an embodiment.

FIG. 2A is flow diagram of the architecture of the DLBC system 130 during the training phase, in accordance with an embodiment. As depicted in FIG. 2A, the forward flow of information between modules is depicted as solid arrows whereas the feedback of information is depicted as dotted arrows. In various embodiments, information that is to be fed back through the modules is stored in the training data store 190 such that the appropriate module can retrieve the information to train a machine learning model.

During the training phase, the encoder module 140 receives an input image 205. The input image 205 may be selected specifically for the training phase and obtained from the training data store 190. In various embodiments, the content encoder module 140 employs a feature extraction module 210, a quantization module 215, a bitplane decomposition module 220, a progressive representation module 250, and an adaptive arithmetic coding (AAC) module 225. As previously stated, the encoder module 140 trains machine learning models to efficiently encode the input image 205 into compressed code. More specifically, individual modules in the encoder module 140 including the feature extraction module 210 and the AAC module 225 each train at least one machine learning model to generate the compressed binary codes.

The feature extraction module 210 trains and applies a machine learning model, e.g., feature extraction model, such that the feature extraction module 210 can use the trained feature extraction model to recognize different types of structures in the input image 205. In one embodiment, 3 different types of structures in an input image are recognized: (1) structures across input channels of the image, (2) structures within individual scales, and (3) structures across scales. In various embodiments, the input image 205 may be a video frame of a video content that contains a sequence of video frames. To process a sequence of video frames, the feature extraction model may be trained with respect to the temporal sequence of video frames such that the feature extraction module 210 can effectively exploit structures across the sequence of video frames of the video content. To identify structures in the input image 205, the feature extraction module 210 performs a pyramidal decomposition on the input image, which analyzes the input image at individual scales by downsampling the original input image. Thus, the feature extraction module 210 extracts coefficients at each individual scale. Subsequently, the feature extraction module 210 performs an interscale alignment procedure which exploits structures shared across the individual scales.

Figure 3A:
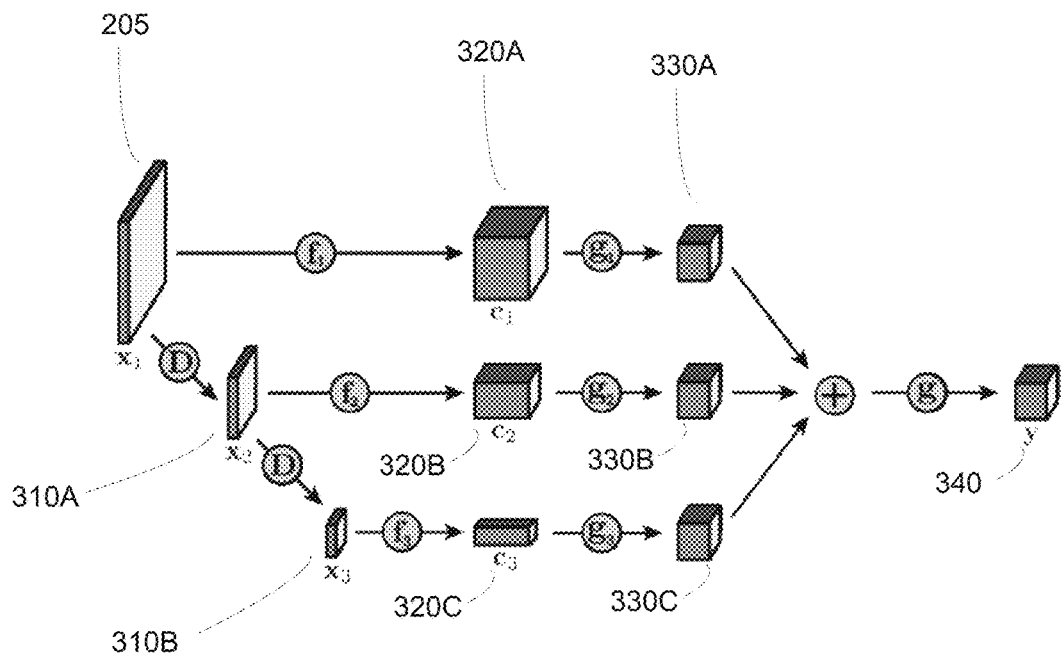
FIG. 3A depicts an example coefficient extraction process for identifying structures in an input image, in accordance with an embodiment.

Reference is now made to FIG. 3A, which depicts an example coefficient extraction process performed by the feature extraction module 210 for identifying structures in an input image 205, in accordance with an embodiment. The feature extraction module 210 receives an input image x and performs recursive analysis of the input image x over a total of M scales, where parameter $x_m$ represents the input image x to scale m and the input to the first scale is set to $x_1 = x$. For each scale, the feature extraction module 210 performs two operations: (1) extracting coefficients $c_m = f_m(x_m) \in R^{C_m \times H_m \times W_m}$ via a parameterized function $f_m(\cdot)$ for output channels $C_m$, height $H_m$, and width $W_m$; and (2) computing the input to the next scale as $x_{m+1} = D_m(x_m)$, where $D_m(\cdot)$ is downsampling operator for the mth scale.

The feature extraction module 210 begins with the input image 205 that has an initial dimensionality at an initial scale of an initial height ($H_0$), an initial width ($W_0$), and an initial number of channels ($C_0$). The feature extraction module 210 downsamples (represented by the "D" function depicted in FIG. 3A) the input image 205 to a second scale to get a first downscaled image 310A. In various embodiments, the first downscaled image 310A has a dimensionality at this second scale of a first downscaled height ($H_1$), a first downscaled width ($W_1$), and a first number of channels ($C_1$). The first downscaled height ($H_1$) and a first downscaled width ($W_1$) are each reduced from the initial height ($H_0$) and initial width ($W_0$), respectively of the input image 205 at the initial scale. The first number of channels ($C_1$) may be increased or decreased from initial number of channels ($C_0$) according to the downsampling operator. The feature extraction module 210 may continue to downscale the first downscaled image 310A (e.g., at a second scale) to obtain a second downscaled image 310B (e.g., at a third scale) using another downscaling operator. The feature extraction module 210 can continue downscaling for a total of M scales to generate a total of M−1 downscaled images 310.

As an example, the input image 205 may have initial C×H×W dimensions of 3×1080×1920. Therefore, the feature extraction module 210 applies a downsampling operator $D_1(\bullet)$ to downsample the input image 205 to generate a first downsampled image 310A with dimensions of 64×540×960. This can be further downsampled using downsampling operator $D_2(\bullet)$ to a second downsampled image 310B with dimensions of 64×270×480. Although this example depicts a decreasing dimensionality of the height and width by a factor of 2 after the application of a downsampling operator, the dimensionality may be reduced in other fashions (e.g., non-linearly) according to the downsampling operator. In various embodiments, the downsampler operator $D_m(\bullet)$ is non-linear and is applied by a trained machine learning model that is trained during the training phase to identify the optimal downsampling operator for identifying structures in the input image 205.

At each individual scale, the feature extraction module 210 may employ a trained feature extraction model specific for that scale. The trained feature extraction model identifies the coefficients of the input image for extraction at each scale. As such, as an input image 205 is downscaled to different scales of the M total scales, the feature extraction module 210 may successively input a trained feature extraction model for a first scale m into the next scale m+1 in order to train a complex feature extraction model for the next scale.

Therefore, at each scale, the feature extraction module 210 extracts coefficients from each input image $x_m$ via a parameterized function $f_m(\bullet)$ as shown in FIG. 3A. The extracted coefficients from each individual scale in may be represented as $c_m$. As depicted in FIG. 3A, the extracted coefficients from input image 205 are represented as $c_1$ (320A), the extracted coefficients from downscaled first image 310A are represented as $c_2$ (320B), and the extracted coefficients from downscaled second image 310B are represented as $c_3$ (320C).

In various embodiments, if the input image 205 is a video frame from a video content, the feature extraction module 210 extracts coefficients from the video frame while also considering the identified structures (i.e., extracted coefficients) from prior video frames of the video content. For example, the feature extraction module 210 may further train a frame predictor model that outputs a residual frame based on a predicted current frame given an input of one or more previous frames and actual current frame of the video content. In other embodiments, the frame predictor model predicts feature coefficients in the residual frame given the feature coefficients of the previous frames and feature coefficients of the actual current frame. As an example, the frame predictor model receives extracted feature coefficients from previous video frames that are M different scales. The frame predictor model then predicts coefficients at a same or different number of scales.

With the extracted coefficients at a variety of individual scales, the feature extraction module 210 conducts an inter-scale alignment that is designed to leverage the information shared across the different scales. In other words, the feature extraction module 210 identifies joint structures across the individual scales according to the extracted coefficients. It takes in as input the set of coefficients extracted from each individual scale, $\{c_m\}_{m+1}^{M} \in \mathbb{R}^{C_m \times H_m \times W_m}$, and produces a tensor of a target output dimensionality C×H×W. In various embodiments, the target output dimensionality may be pre-determined (e.g., hard-coded) given the dimensionality of the input image 205 across the scales.

To do this, the set of extracted coefficients from each individual scale $C_m$ are mapped to the target output dimensionality via a parameterized function $g_m(\bullet)$ as depicted in FIG. 3A. Therefore, at each individual scale, a single tensor with the same output dimensionality (i.e., appropriate output map size H×W, as well as the appropriate number of channels C) is generated (e.g., 330A, 330B, and 330C). The individual tensors 330A, 330B, and 330C are summed across all scales $g_m(c_m)$, m=1, . . . , M, and optionally in an alternative embodiment, another non-linear transformation $g(\bullet)$ is applied for joint processing. As such, as depicted in FIG. 3A, the feature extraction module 205 generates a summed tensor 340, hereafter denoted as tensor $y \in \mathbb{R}^{C \times H \times W}$, which is quantized and encoded.

As described above, during the training phase, the feature extraction module 205 trains a feature extraction model using machine learning techniques, e.g., a convolutional network, that determines (1) the downsampling operator for generating M individual levels of downsampled images 310 and (2) the parameterized functions $f_m(\bullet)$, $g_m(\bullet)$, and $g(\bullet)$. In one embodiment, the feature extraction module 205 recursively analyzes images from a training set via feature extraction and downsampling operators to extract coefficients from the images. The parameterized functions $f_m(\bullet)$, $g_m(\bullet)$, and $g(\bullet)$ are represented by one or more convolutional layers with non-linearities in between.

In various embodiments, the feature extraction module 205 iteratively trains the parameters of the feature extraction model using numerous training input images 205 and further incorporates feedback provided by the ACR module 160 and the reconstruction feedback module 170. In other embodiments, the feature extraction module 205 further incorporates feedback from the discrimination module 180. For example, the feedback provided by the ACR module 160 represents a penalty loss that enables the feature extraction model to extract feature coefficients that can be more efficiently compressed to meet a target codelength. Additionally, the feedback provided by the reconstruction feedback module 170 represents a reconstruction quality loss between a reconstructed input image 275 and the original input image 205. As such, the feature extraction model considers this feedback to extract feature coefficients that enable high quality reconstructions. Thus, the feature extraction model is iteratively trained to extract feature coefficients that, when compressed by the AAC module 225, effectively balance the reconstruction loss and penalty loss.

In various embodiments, the quantization module 215 is given a desired precision of B number of bits. The desired precision of B bits is set to maximize the quality of the reconstructed image while also achieving a particular target compression rate or bit rate. The machine learning model of the feature extraction module 205 can be trained to recognize the identified joint structures from the feature extraction module 210 given a target desired precision of bits. For example, the target desired precision of bits is selected to minimize the loss of the identified structures during quantization process.

Given the extracted tensor $y \in R^{C \times H \times W}$, the quantization module 215 quantizes the extracted tensor y 340 from the feature extraction module 210 to a target desired precision of B number of bits to generate a quantized tensor ŷ. For example, the extracted tensor y 340 with dimensionality C×H×W is quantized into $2^B$ equal-sized bins as described by Equation (1) below. Other embodiments may use other quantization formulas.

$$\hat{y} := QUANTIZE_B(y) = QUANTIZE_B(y_{chw}) = \frac{1}{2^{B-1}} [2^{B-1} y_{chw}] \quad (1)$$

In various embodiments, the quantization module 215 is given a desired precision of B number of bits. The desired precision of B number of bits may be hard-coded according to the size (e.g., pixels) of the input image 205. In various embodiments, the number of bits may be set based on the identified joint structures from the feature extraction module 210. For example, the number of bits may be previously set such that the identified structures are not lost during quantization.

The bitplane decomposition module 220 decomposes the quantized coefficients. For example, the bitplane decomposition module 220 decomposes the quantized tensor into a binary tensor of multiple bitplanes, which is suitable for encoding via an invertible bitplane decomposition, as described by Equation (2) below.

$$b := \text{BITPLANEDECOMPOSE}(\hat{y}) \in \{0,1\}^{B \times C \times H \times W} \quad (2)$$

Figure 3B:
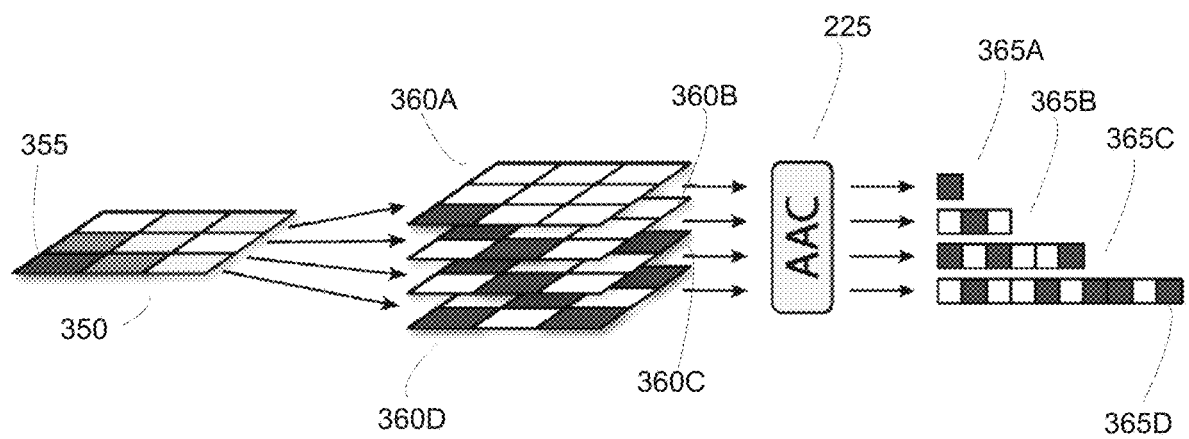
FIG. 3B depicts an example process of bitplane decomposition and adaptive arithmetic coding, in accordance with an embodiment.

Reference is now made to FIG. 3B, which depicts an example process of bitplane decomposition and arithmetic coding of each bitplane, in accordance with an embodiment. The quantization process of coefficients does not affect the dimensionality of the quantized tensor ŷ, and therefore it may have a dimensionality of C×H×W. FIG. 3B depicts an input of a single channel 350 of the quantized tensor ŷ with a 2-dimensional dimensionality of H×W quantized coefficients being decomposed into B bitplanes, where H=3, W=3, and B=4. Each quantized coefficient is represented by a quantized value expressed by the B number of bits applied by the quantization module 215. For each channel 350 of the quantized tensor ŷ, the bitplane decomposition module 220 decomposes the quantized tensor ŷ into B number of bitplanes. As depicted in FIG. 3B, the channel 350 is decomposed into 4 bitplanes. For example, for each quantized coefficient, the first bitplane 360A is the highest bitplane that corresponds to the bits of the quantized coefficient at the highest bitplane. The second bitplane 360B is the second highest bitplane that corresponds to the bits of the quantized coefficient at the second bitplane. Similarly, the third bitplane 360C and the fourth bitplane 360D are the third and fourth highest bitplanes that correspond to the bits of the quantized coefficient at the third and fourth bitplane, respectively. The output of the bitplane decomposition module 220 is a binary tensor of size B×C×H×W and is denoted as $b \in \{0,1\}^{B \times C \times H \times W}$. That is, for each channel C, there are B bitplanes, each bitplane having a height H and a width W. This bitplane decomposition expands each quantized coefficient into B bitplanes of binary values, and this decomposition is an invertible transformation.

In various embodiments, the bitplane decomposition module 220 provides the binary tensor of size B×C×H×W to the progressive representation module 250. The progressive representation module 250 generates a progressive representation of the input image by determining which portions of the binary tensor to include in the progressive representation. During the training phase, the progressive representation module 250 trains a zero-mask that determines which bitplanes and channels to include within the progressive representation given a target rate. As such, the bitplanes and channels included within the progressive representation are provided to the AAC module 225. The progressive representation module 250 is described in further detail below.

Each of the bitplanes and channels included in the progressive representation are then encoded by the adaptive arithmetic coding module, e.g., AAC 225, for variable-length encoding, as described by Equation (3) below:

$$s := AAC\_ENCODE(b) \in \{0,1\}^{\ell(s)}. \quad (3)$$

where b is encoded by AAC 225 into its final variable-length binary sequence s of length $\ell(s)$. The AAC module 225 further compresses the output from the bitplane decomposition module 220 to improve the compact representation of an input image. In one embodiment, the AAC module 225 compresses via adaptive arithmetic coding, which is a variable-length encoding. The AAC module 225 leverages the fact that the higher bit planes such as the first bitplane 360A and/or the second bitplane 360B shown in FIG. 3B are often sparser (e.g., many 0 values).

Additionally, the quantized coefficients, in the higher bitplanes, often have similar values as their neighboring quantized coefficients. As such, the AAC module 225 can train a machine learning model based on these facts that enables the individual bitplanes to be encoded with variable length. As an example, FIG. 3B depicts that the highest bitplane (e.g., first bitplane 360A) can be encoded by a first set of bits (e.g., an individual bit 365A), the second bitplane 360B can be encoded by a second set of bits 365B (e.g., 3 total bits), the third bitplane 360C can be encoded by a third set of bits 365C (e.g., 6 total bits), and the fourth bitplane 360D can be encoded by a fourth set of bits 365D (e.g., 10 total bits). The process performed by the AAC module 225 is described in detail below.

In one embodiment, the AAC module 225 trains a machine learning model to associate a processing unit within a bitplane with a context feature, which is one of K discrete values based on its context. The description hereafter is in reference to a single bit, however, in other embodiments, the AAC module 225 may also handle groups of bits (e.g., more than one bit), hereafter referred to as a processing unit. The context of a current bit, may include, among other features, the value of its neighboring bits (e.g., bits to the left, above and in previous bitplanes of the current bit location), as well as the current bit's channel index, and bitplane index (e.g., high or low bitplane). Another feature is whether any co-located bits of previously processed bitplane indices are non-zero. For example, a previously processed bitplane index is a higher bitplane. During training, for each of the K context features, the machine learning model is trained to predict a feature probability which represents the likelihood that bits with that feature having a value of 1. In one embodiment, the feature probability is the empirical expected value of bits for each feature K after applying a Laplace smoothing operation.

Figure 4A:
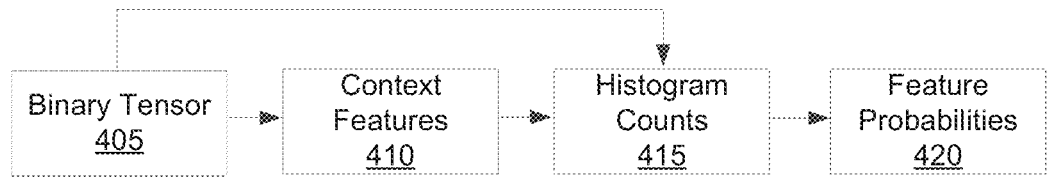
FIG. 4A illustrates the training process of an adaptive arithmetic coding module, in accordance with an embodiment.

Reference is now made to FIG. 4A which illustrates the training process of the AAC module 225 to train a machine learning model to predict probability of context features, in accordance with an embodiment. The output of bitplane decomposition (e.g., binary code 405: B×C×H×W∈(0,1)) is used as input to train the model that determines context feature probabilities 420. Specifically, each bit location in a decomposed bitplane is associated with a context feature 410, which is one of K discrete values based on its context (e.g., B×C×H×W∈(1, K)). The context may include, among other features, the current bit's channel index, bitplane index (e.g., high or low bitplane), and value of neighboring bits. For example, a neighboring bit may be a bit in the same bitplane that is to the immediate left, immediate above, or immediate left and above (e.g., diagonal) to the current bit location. During training, for each of the K context features, the machine learning model is trained to predict a feature probability 420 which represents the likelihood that a bit with that context feature 410 has a value of 1. For example, the feature probability 420 may be calculated based on a total histogram count 415 of bits (e.g., positive $1 \times K \in Z_{\geq 0}$, total $1 \times k \in Z_{\geq 0}$) from the binary code 405 with each of the K context features. In various embodiments, the feature probability 420 (e.g., $1 \times K \in (0,1]$) is calculated as the fraction of times in the training data the bit associated with that feature had the value 1, possibly smoothed with a Laplace smoothing process. The AAC module 225 stores the calculated feature probability 420 in the training data store 190 (shown in FIG. 1) for predicting context feature probabilities during a deployment phase.

Figure 4B:
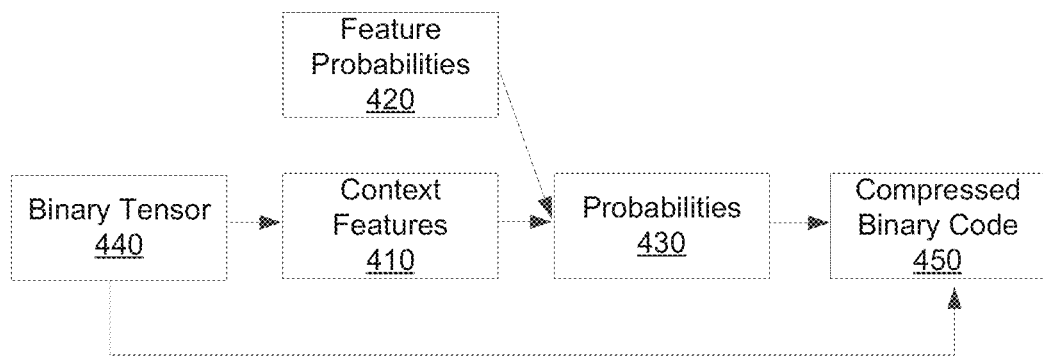
FIG. 4B illustrates the deployment process of the adaptive arithmetic coding module, in accordance with an embodiment.

The machine learning model, which is trained to predict the feature probabilities 420, is later used during the deployment phase. As shown in FIG. 4B, the AAC module 225 computes the probabilities 430 of input binary tensor 440 using the pre-calculated feature probabilities 420 predicted by the trained model, e.g., by mapping the context features 410 for each bit of the binary tensor 440 to the corresponding context features of the pre-calculated feature probabilities 420, Based on the computed probabilities 430, the AAC module 225 compresses the binary code 440 using adaptive arithmetic coding to generate the compressed binary code 450. Deployment of the trained model of the AAC module 225 is further described below.

Reconstruction Process

Referring back to FIG. 2A, FIG. 2A further depicts the decoder module 150 that includes an adaptive arithmetic decoder (AAD) module 230, a bitplane composition module 235 and a feature synthesizer module 240. In various embodiments, the decoder module 150 receives the compressed binary code from the encoder module 140 and reconstructs the input image 205 by reversing the process undertaken by the encoder module 140.

For example, the AAD module 230 reverses the compression process undertaken by the AAC module 225 by applying an adaptive arithmetic decoding to the compressed binary code. In various embodiments, the AAD module 230 may use the machine learning model trained by the AAC module 225 to obtain the probabilities of context features of the compressed binary code. For example, the AAD module 230 receives the compressed binary code (e.g., 450 from FIG. 4B) and applies the model that is trained to compute the context feature 410 for each bit based on its context inferred from previously decoded bits. Then, the AAD module 230 uses the feature probability 420 to decode the bit of the compressed binary code 450. As such, the binary code 440 can be regenerated from the compressed binary code 450.

The bitplane composition module 225 re-compositions or compounds the B binary images (corresponding to B different bitplanes) to generate a re-composed image of coefficients having $2^B$ possible values. As previously stated, the decomposition of quantized coefficients of an input image into the bitplanes is an invertible transformation. Similarly, the compositioning of the bitplanes is also an invertible transformation. The new recomposed image is used to generate the quantized tensor $\hat{y}$ of the above Equation (1).

The feature synthesizer module 240 recognizes the structures previously identified by the feature extraction module 210 (e.g., as described by Equation (1) above) and outputs the reconstructed input image 275. In some embodiments the feature synthesizer module 240 performs the inverse operation of FIG. 3A. That is, starting with a reconstructed tensor $\hat{y}$, the feature synthesizer module 240 applies a transformation $g'()$, and further transforms the output by transformation $g_1'()$, $g_{21}'()$ ... to obtain coefficient tensors $c_1'$, $c_2'$, ... for each scale, then applies image synthesis transformations $f_1'$, $f_2'$ ..., to obtain reconstructions at each scale. Each of them is upsampled to the next scale using transformations $D_m'$ and added together to obtain the reconstructed image 275. In some embodiments the transformations $D_m'$, $f_m'(\bullet)$, $g_m'(\bullet)$, and $g'(\bullet)$ are set to be the inverse of the corresponding transformations in the feature extraction module 210, and in other embodiments they are trained independently. However, given that the process to generate the quantized tensor $\hat{y}$ is a lossy operation, there is a loss in quality in the reconstructed input image 275.

The reconstructed input image 275 and the original input image 205 are each provided to the reconstruction feedback module 170 to determine the amount of degradation in quality that has occurred during the encoding and decoding processes, as conducted by the encoder module 140 and the decoder module 150, respectively. The reconstruction feedback module 170 may employ methods that are well known in the art to determine the deviation between the input image 205 and the output image 275. As one example, the reconstruction feedback module 170 calculates differences of pixel values between the input image 205 and reconstructed input image 275. As another example, the reconstruction feedback module 170 conducts a pixel by pixel analysis and calculates a mean-square error or a root-mean-square deviation between the input image 205 and the output image 275, as well as more sophisticated metrics that consider differences in gradient space as well as over multiple scales, such as Structural Similarity Index (SSIM) or Multi-Scale SSIM (MS-SSIM). Other quality metrics of the quality loss include Peak signal-to-noise ratio (PSNR), Sobel loss, L1-norm, or L2-norm. The calculated deviation between the input image 205 and the output image 275 indicates the quality loss of compression from the encoder module 140.

The SSIM is a measure of quality that compares the means and variances of the reconstruction and compares them to the original. The multi-scale variant of SSIM (MS-SSIM) performs that operation over multiple scales. In various embodiments, the trained model is a neural network and the feedback is achieved via backpropagation using gradient descent. In the case of SSIM and MS-SSIM loss, the derivative of the loss is computed during the backpropagation step.

In various embodiments, the reconstruction feedback module 170 provides the quality loss in the output image 275 as feedback to the encoder module 140. For example, the quality loss information can be stored in the training data store 190 to be used as training data to fine tune the trained machine learning models associated with the encoder module 140. As depicted by the dotted lines from the reconstruction feedback module 170 in the FIG. 2A, the quality loss information is provided as feedback to the encoder module 140 through the decoder module 150 and the ACR module 160, which regulates the final code length of the input image 205 compressed by the encoder module 140.

More specifically, within the encoder module 140, the quality loss information is provided to the feature extraction module 210 to the train the feature extraction model to better represent structures within the input image 205. For example, if quality loss is significant, the feature extraction model can adjust the operators (e.g., D, $f_m(\bullet)$, $g_m(\bullet)$, and $g(\bullet)$) and/or increase the number of individual scales performed during the pyramidal decomposition process. The quality loss is also provided to the feature synthesizer module 240 and used to train its corresponding operators $D_m'$, $f_m'(\bullet)$, $g_m'(\bullet)$, and $g'(\bullet)$). The quality loss information is also provided to the AAC module 225 to further train the machine learning model to improve the prediction of feature probabilities 420.

The quality loss information is also provided to the ACR module 160 and is used to regulate the expected codelength of the compressed binary codes of inputs given a target bit rate. This is further discussed in reference to the ACR module 160 below.

Generative Adversarial Networks (GNAs)

In various embodiments, during the training phase, the DLBC system 130 further appends a discriminator module 180 that improves the models trained by the encoder module 140 (e.g., the feature extraction model by the feature extraction module 210) through GAN approaches. For example, the discriminator module 180 trains a machine learning model, hereafter referred to as the discriminator model, that, when applied, distinguishes between two images. For example, the two images may be the original input image 205 and the reconstructed input image 275. Thus, feedback from the discriminator module 180 can be provided back to the encoder module 140 (e.g., to the feature extraction module 210) to more efficiently extract feature coefficients.

Specifically, the discriminator module 180 receives the reconstructed input image 275 outputted by the decoder module 150 and the original input image 205 (see FIG. 2A). The discriminator module 180 attempts to distinguish between the two images. To do so, the discriminator module 180 can train a discriminator model offline to recognize artifacts (e.g., distortions, blurriness, pixelation) in the reconstructed input image 275 that differ from the input image 205. In various embodiments, the encoder module 140, decoder module 150, and reconstruction feedback module 170, altogether referred to as the generator pipeline, attempts to generate reconstructed input images 275 that make it more difficult for the discriminator module 180 to distinguish between the reconstructed input image 275 and the original input image 205. Therefore, throughout training, the discriminator module 180 and the generator pipeline conduct their training together in an adversarial manner where the generator pipeline continually tries to generate reconstructed input images 275 that are harder to distinguish from the original input image 205. The result is that the generated reconstructed input images 275 have lower reconstruction loss as training proceeds. The training conducted by the discriminator module 180 and the generator pipeline may occur in parallel or sequentially. In various embodiments, the training conducted by the discriminator module 180 and generator pipeline enables the generator pipeline to generate reconstructed input images 275 that are indistinguishable by the discriminator module 180.

During a training phase, training of the discriminator model by the discriminator module 180 can be complicated due to optimization instability. In various embodiments, an adaptive training scheme can be utilized. For example, the discriminator module 180 can choose to either train the discriminator model or backpropagate a confusion signal through the generator pipeline a function of the prediction accuracy of the trained model. The confusion signal makes it more difficult for the trained discriminator model to distinguish between the original input image 205 and the reconstructed input image 275. For example, if the prediction accuracy of the trained model is high, the discriminator module 180 may choose to backpropagate a confusion signal through the encoder module 140.

More concretely, given lower and upper accuracy bounds L, U$\in$[0, 1] and discriminator accuracy a(D), the following procedure is applied:

If a<L: stop propagating confusion signal, and continuously train the discriminator model.

If L$\leq$a<U: alternate continuously between propagating confusion signal and training the discriminator model.

If U$\leq$a: continuously propagate confusion signal, and freeze the training of the discriminator model.

During training, the original input image 205 and the reconstructed input image 275 are provided to the discrimination module as an input pair. The discrimination module considers each received image with uniform probability that it is either the original or the reconstructed image. For example, a random binary label can be assigned to the input pair and the order of the input image 205 and the reconstructed input image 275 can be swapped or held the same depending on the random binary label. The input pair is then propagated through the network which, in various embodiments, analyzes the input pair at multiple scales. For example, the discriminator module 180 applies the trained model that downscales the input image 205 and the reconstructed input image 275. At each scale, the trained model accumulates scalar outputs that are averaged to attain a final value. The final values are provided to a terminal sigmoid function (e.g., summed) to generate an aggregate sum across scales. The discriminator module 180 proceeds to formulate a decision on the original input image 205 and reconstructed input image 275 according to the aggregated sum.

This multiscale architecture of the discriminator module 180 allows aggregating information across different scales, and is motivated by the observation that undesirable artifacts vary as a function of the scale in which they are exhibited. For example, high frequency artifacts such as noise and blurriness are discovered by earlier scales, whereas finer discrepancies are found in deeper scales.

Codelength Regularization Process

The ACR module 160 regulates the expected codelength of the compressed binary code of an input image to balance the different objectives of 1) reconstruction quality and 2) compression ratio as described by Equation (4) below:

$$E_x[\ell(s)] = \ell_{target} \qquad (4)$$

It is noted that compressed binary codes of input images can be a bottleneck of an encoder's performance because the binary codes may be too small to represent complex patterns of content of input images, which affects visual quality, and the binary code may be too wasteful in representing simple patterns. The ACR module 160 trains a model capable of generating long representations for complex content patterns and short ones for simple content patterns, while maintaining an expected codelength target over a large number of training examples.

Referring to FIG. 2A, the ACR module 160 receives a compressed binary code of an input image generated by the AAC module 225. Additionally, the ACR module 160 receives the quantized tensor $\hat{y}$ from the quantization module 215. The ACR module 160 controls the expected length of the compressed code (the output of the AAC module 225).

In some embodiments the ACR module 160 controls the sparsity of the binary feature tensor since sparser messages are more predictable and result in more compact compression by the AAC module 225. In some embodiments, sparsity is induced by an activation penalty loss for each quantized coefficient proportional to its magnitude. This results in adjusting the feature extraction module 210 to produce coefficients with smaller magnitudes, which induces sparsity in the higher bitplanes produced from the bitplane decomposition. Inducing sparsity is a special-case of making the sequence of bits in the binary feature tensor more predictable, which results in more compact compressed code. In other embodiments, the ACR module 160 increases predictability by adding a penalty that induces spatially adjacent coefficients to have more similar magnitudes.

Specifically, the ACR module 160 calculates a penalty score for each quantized coefficient of the quantized tensor $\hat{y}$. The penalty for a quantized coefficient at a particular position chw in the quantized tensor $\hat{y}$ may be expressed as Equation (5) below:

$$P(\hat{y}_{chw}) = \log_2 |\hat{y}_{chw}| + \Sigma_{(x,y) \in S} \log_2 |\hat{y}_{chw} - \hat{y}_{c(h-y)(w-x)}| \} \quad (5)$$

for difference index set $S=\{(0,1), (1,0), (1,1), (-1,1)\}$.

A first penalty factor corresponds to the first term of the penalty Equation (5) (e.g., $\log_2 |\hat{y}_{chw}|$), which represents a magnitude penalty and penalizes a quantized coefficient of interest based on the magnitude of its quantized value. Therefore, quantized coefficients that are large in magnitude are more heavily penalized than quantized coefficients that are smaller in magnitude. This reflects the higher sparsity of bits in the higher bitplanes. A second penalty factor corresponds to a second term (e.g., $\Sigma_{(x,y) \in S} \log_2 |\hat{y}_{chw} - \hat{y}_{c(h-y)(w-x)}|$), which represents a spatial penalty as it penalizes deviations between neighboring quantized coefficients, which enables better prediction by the AAC module 225. Neighboring quantized coefficients include quantized coefficients that are immediately adjacent to the quantized coefficient of interest in a bit location in the same bitplane. Additionally, neighboring quantized coefficients may also include quantized coefficients that are in the same bit location in an immediately preceding bitplane. This reflects the likelihood that a quantized coefficient of interest and its neighboring quantized coefficients often have similar quantized values.

In various embodiments, the calculated penalty for a quantized coefficient further includes a third penalty factor that is dependent on how heavily the quantized coefficient impacts the length of the compressed binary code. For example, during training, the ACR module 160 may calculate the third penalty factor by changing the value of the quantized coefficient. For each bit in the B×C×H×W tensor, the ACR module 160 can produce the third penalty factor that can be proportional to the change in encoded message length as a result of flipping that bit.

The calculated penalties of the quantized coefficients are provided to the feature extraction module 210 to adjust the parameters of the model trained by the feature extraction module 210 such that future feature coefficients extracted by the trained model can be more efficiently compressed by the AAC module 225. More specifically, the magnitude of the ACR module 160 penalty loss that is provided to the feature extraction module 210 controls the tradeoff between reconstruction quality and compression rate. In some embodiments, this tradeoff is controlled by having the ACR module 160 observe the average length of compressed binary codes during training and compare it to a target codelength.

Specifically, the ACR module 160 may calculate a penalty for the quantized tensor $\hat{y}$ based on the individual penalties of the quantized coefficients as shown above in Equation (5). For example, the penalty may be calculated as:

$$P(\hat{y}) = \frac{\alpha_t}{CHW} \sum_{chw} \{P(\hat{y}_{chw})\} \quad (6)$$

The penalty equation of Equation 6 also includes a scalar value $\alpha_t$ that is modulated based on the model trained by the ACR module 160. During the training phase, the ACR module 160 may monitor a mean number of effective bits of the compressed binary code received from the AAC module 225 for numerous input images 205. If the monitored mean number of effective bits is higher than a target codelength, the trained model increases the scalar value $\alpha_t$ to increase the penalty value for each quantized coefficient. Likewise, if the monitored mean number of effective bits is lower than a target codelength, the trained model decreases the scalar value $\alpha_t$.

In other embodiments, the ACR module 160 modulates the magnitude of the scalar value $\alpha_t$ to achieve a given target reconstruction quality rate. In this case, instead of receiving the compressed codelength from AAC module 225, the ACR module 160 receives the reconstruction quality from reconstruction feedback module 170.

Progressive Representation

Returning to the progressive representation module 250 as depicted in FIG. 2A, it is often desirable to construct progressive versions of a compressed code of an input image, which enable reconstructing the input image given only a truncation of its representation, e.g., only the first few bits of its compressed code. A progressive representation is valuable in various scenarios. For example, in streaming settings, a progressive representation allows displaying digital content to a user right away as opposed to waiting for transmission of the entire compressed code to complete. The quality of the reconstruction is improved as additional bits of the compressed code arrive. For example, a progressive version is beneficial in that if the progressive version is sent to a client device 110, the client device 110 can appropriately reconstruct the input image 205 right away using transmitted bits of the progressive version as opposed to waiting for the transmission to complete. The quality of reconstruction of the input image 205 by the client device 110 is further improved as additional bits are received.

Additionally, a progressive version also enables computational efficiency as it is often desirable to send different client devices 110 different bitrate versions of the same content. For example, a highest quality version of the progressive representation may be computed and stored once, and can be subsequently truncated to appropriate lengths to generate different progressive versions that are each appropriate for a target bitrate.

In one embodiment, the progressive representation module shown in FIG. 1 trains a machine learning model, e.g., a neural network of a trained zero-mask that enables a progressive representation. During training, the progressive representation module 250 applies a trained zero-mask to generate a progressive version of an input image as a function of a specified bitrate. In this scenario, the trained zero-mask is input-independent based on a given particular channel index or bitplane index. In another scenario, the trained zero-mask is input dependent, e.g., based on the norm of activations or some other criteria. During deployment, values that are masked will not be transmitted to a client device. Therefore, for a smaller bitrate, the trained zero-mask seeks to mask a larger number of bits, thereby enabling the transmission of fewer bits to a client device 110.

In some embodiments, to train the zero-mask, the progressive representation module 250 randomly samples various rates, each rate represented as $r_t \in (0,1]$. The progressive representation module 250 follows a machine learning technique, e.g., a nested dropout, which trains the zero-mask to map the rate $r_t$ to a particular truncation of the representation (e.g., feature coefficient tensor). For example, the zero-mask can be iteratively trained to identify the particular truncation location. At a first iteration, the zero-mask may target an initial truncation location of the representation. This initial truncation location corresponds to an initial subset of extracted feature coefficients that each has a particular tensor position (e.g., bitplane index and/or channel index). At subsequent iterations, the zero-mask may continue to truncate the representation. In other words, the zero-mask removes additional extracted feature coefficients from the initial subset. In various embodiments, the feature coefficients that are removed from the initial subset have a lower tensor position (e.g., lower channel index and/or lower bitplane index) than feature coefficients that remain. Over the training iterations, the zero-mask settles on a particular truncation location of the representation that corresponds to the rate.

In various embodiments, the representation may have two or more dimensions including a height (H) and width (W). Other dimensions may be channels (C) and bitplanes (B). For example, given a binary tensor $b \in \{0,1\}^{B \times C \times H \times W}$, the progressive representation module 250 trains the model with a zero-mask applied to all values with channel index $c \in \{[r_t C], \ldots, C\}$. In other words, the first channels are rarely zeroed out, while the last channels are highly likely to be zeroed out or masked. This results in the neural network learning that the first channels (e.g., channels with low indices) are more reliable and choosing them to transmit the most important information. During deployment, the progressive representation module 250 uses the trained zero-mask to decide how many of the channels to transmit so that the DLBC system 130 can achieve the right tradeoff between compression size and quality. Although the previous description is in regards to channels, the zero-mask may also be trained to map to a truncation corresponding to a particular position in the representation, hereafter referred to as a tensor position. For example, the zero-mask is trained to map to a truncation corresponding to a particular bitplane (e.g., bitplane index). Therefore, the progressive representation module 250 may additionally or alternatively decide how many bitplanes are to be transmitted. In other embodiments, the zero-mask is trained to map to a truncation corresponding to both channels and bitplanes.

Figure 5:
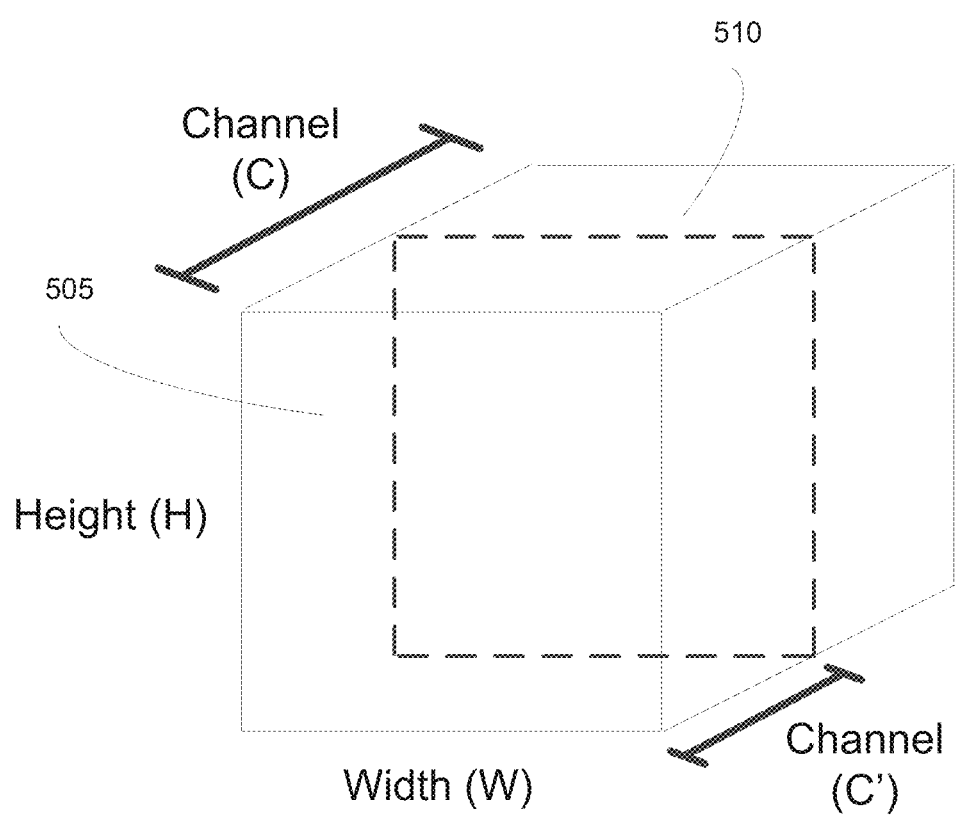
FIG. 5 depicts the generation of a progressive representation of an input image, in accordance with an embodiment.

Reference is now made to FIG. 5, which depicts the generation of a progressive representation of an input image, in accordance with an embodiment. For a target bitrate, the trained zero-mask may truncate 510 (e.g., using a zero mask) the input representation 505 to have a truncated dimensionality of C'×H×W, which provides an acceptable balance between the compression ratio and visual quality of the input representation 505. Therefore, for that target bitrate, the truncated version can be sent to a client device 110.

More specifically, the progressive representation 505 may have original dimensionality B×C×H×W. In various embodiments, the progressive representation module 250 implicitly orders the bitplanes (B) and channels (C) of the input representation 505 based on their respective importance. As an example, each bitplane and channel may be associated with an index. A lower index associated with each bitplane and each channel represents a higher likelihood that the bitplane and/or channel is included in a progressive representation. A higher index represents a lower likelihood that the bitplane and/or channel is included in the progressive representation.

Generally, the most important channels and/or bitplanes are ordered first such that they can be first transmitted to a client device 110. The most important channels and/or bitplanes represent the bits that enable the client device 110 to reconstruct the input image. The subsequent data channels ordered behind the most important channels and/or bitplanes represent the bits that, when transmitted to a client device 110, enable the reconstruction of the input image at a higher quality. As such, the most important channels and/or bitplanes are not affected by the applied zero-mask, whereas the channels and/or bitplanes that are ordered below a truncation point are zeroed by the applied zero-mask.

In other embodiments, the zero-mask may be applied on the binary B×C×H×W tensor after bitplane decomposition. The mask may be set up to zero-out the least significant (e.g., highest index) bitplanes (i.e. the zero-mask is applied along the bitplane dimension). In other embodiments, the zero-mask may be applied along both channel and bitplane dimensions. As an example, the zero-mask may be applied to progressively zero out bitplanes of a given channel before going to the next one. As another example, the zero-mask may be applied with mixed ordering, such as the first bitplane of the first channel, then the first bitplane of the second channel, then the second bitplane of the first channel, and so on.

For example, a first representation in the set of representations is transmitted first to a client device 110. The first representation corresponds to the most important information (e.g., bits) that even the client device 110 with a lowest target bitrate can adequately reconstruct, albeit at low quality. Subsequent representations in the set of representations each include bits that, when transmitted to a client device 110 with a higher target bitrate, enables the client device 110 to reconstruct the input image with a higher quality.

Deployment Phase of the Encoding Process

Figure 2B:
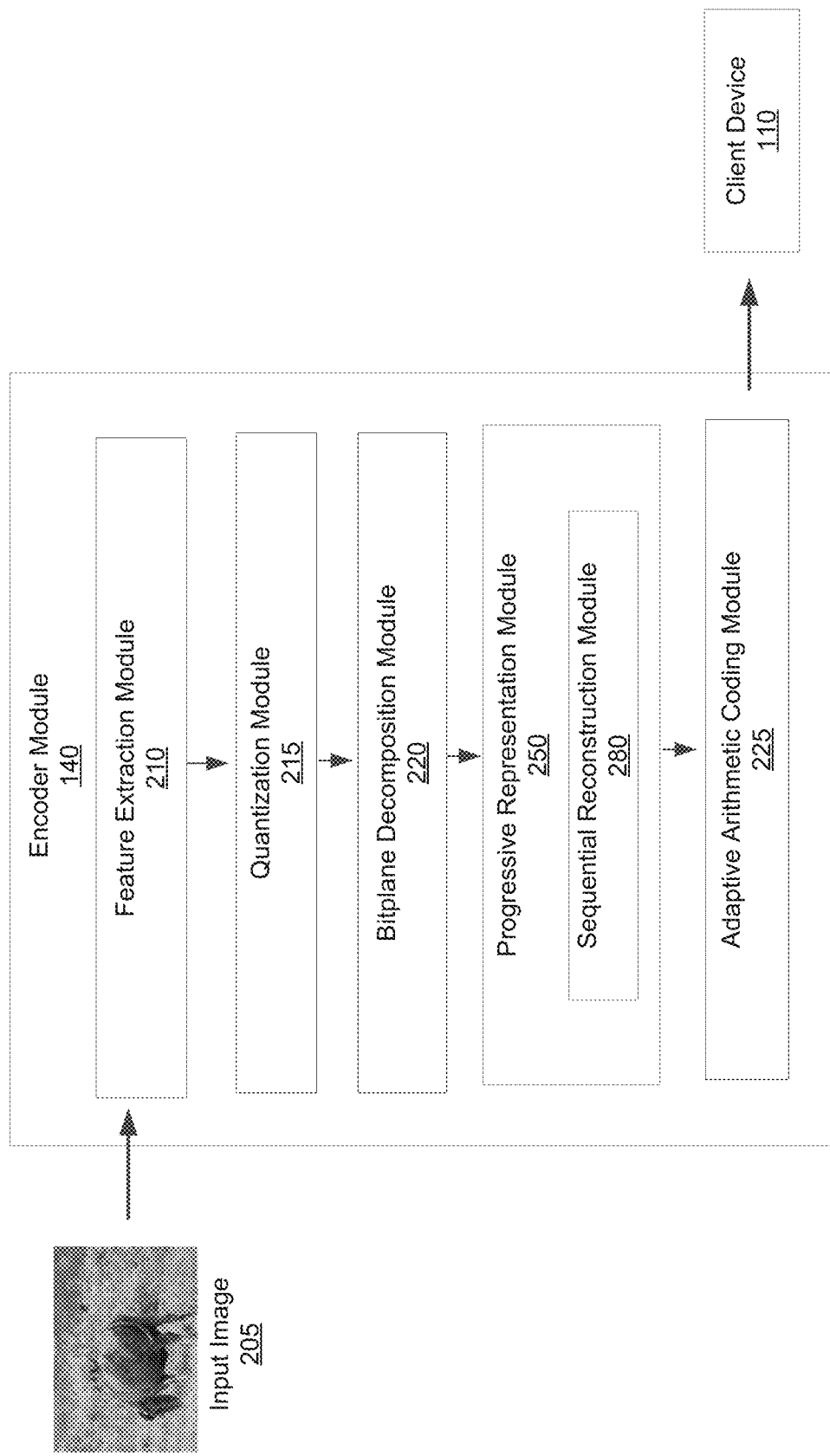
FIG. 2B is flow diagram of the architecture of the deep learning based compression system during the deployment phase, in accordance with an embodiment.

Referring back to FIG. 2B, FIG. 2B is flow diagram of the architecture of the DLBC system 130 during the deployment phase, in accordance with an embodiment. The feature extraction module 210 of the encoder module 140 receives an input image 205 that is to be sent to one or more client devices 110. The feature extraction model 210 applies a trained model that produces the extracted feature coefficients tensor 340 with a target output dimensionality of C×H×W. In some embodiments, this is accomplished through pyramidal decomposition followed by interscale alignment. The quantization module 215 quantizes the extracted feature coefficients tensor 340 and outputs the quantized tensor $\hat{y}$. The bitplane decomposition module 220 separates the individual channels of the quantized tensor $\hat{y}$ and for each individual channel 350, decomposes the channel into binary bitplanes 360 through an invertible transformation. The binary bitplanes 360 are provided to the progressive representation module 250 to determine the bitplanes (and channels) that will be transmitted to a client device 110.

The progressive representation module 250 generates an appropriate progressive representation of the input image 205. For example, the progressive representation module 250 receives an indication of a specified rate, e.g., target bit rate for a client device 110. A specific bitrate may be provided by the client device 110 and reflects certain limitations of the client device 110 (e.g., bandwidth, processing power, computing resources). The progressive representation module 250 retrieves a version of the compressed binary code for the input image that represents the highest quality version (e.g., includes the most bits) of the input image. The progressive representation module 250 applies a trained model, otherwise referred to as a trained zero-mask, that is previously trained to map the specified rate to a particular truncation of a representation (e.g., quantized tensor $\hat{y}$). As an example, referring to FIG. 5, the first few channels (e.g., C' in FIG. 5) of the input representation 505 may be maintained while the last remaining channels are zeroed by the applied zero-mask. The progressive representation is a representation of the input image 205 for that particular specified rate.

The progressive representation is provided to the AAC module 225 for adaptive arithmetic coding. The AAC module 225 further compresses the bitplanes 360 (e.g., binary code 440) to generate compressed binary code 450. To do so, the AAC module 225 applies a trained model that was previously trained to predict feature probabilities 420 from a set of binary code 405.

Reference is now made to FIG. 4B, which illustrates the deployment process of the AAC module 225, in accordance with an embodiment. Here, each bit of the binary code 440 is similarly associated with one or more context features 410 based on the context of the bit. The feature probabilities 420 are received from the model trained by the AAC module 225 and are used in conjunction with the binary code 440 such that a probability 430 of a value (e.g., 0 or 1) of each context feature 410 can be looked up. In various embodiments, the AAC module 225 determines, for each bit, a probability 430 that the bit has a value of 1 based on the context of the previously seen, neighboring bits. Thus, the AAC module 225 can use the probabilities 430 to further compress the binary code 440 via arithmetic coding into a compressed variable length binary code 450. This compressed binary code 450 can be transmitted to a client device 110 for appropriate decoding and playback.

Providing a Progressive Representation Through Sequential Reconstruction

In various embodiments, during deployment, the encoder module 140 generates compressed binary codes for a progressive representation of an input image 205 using sequential reconstruction, a process that is performed by the sequential reconstruction module 280. For example, the progressive representation module 250 may receive the decomposed bitplanes from the bitplane decomposition module 220 that altogether represents a binary tensor with dimensions B×C×H×W. The sequential reconstruction module 280 generates a first representation from the binary tensor. As an example, the first representation may be a default representation that corresponds to a lowest target bitrate. This first representation is provided to the AAC module 225 for compression, which outputs the compressed binary codes corresponding to this first representation.

In various embodiments, the compressed binary codes corresponding to this first representation is decoded by the decoder module 150 of the DLBC system 130 to generate a reconstructed input image. The reconstructed input image is compared to the original input image to determine a difference, hereafter referred to as an error. This error may be provided back to the sequential reconstruction module 280 which generates a second representation corresponding to this difference. The second representation is compressed by the AAC module 225 to generate compressed binary codes corresponding to the second representation and the process is repeated. For example, these compressed binary codes are decoded, compared to the original input image to generate a second difference, which the sequential reconstruction module 280 can generate a third representation that corresponds to the second difference. In one embodiment, the compressed binary codes corresponding to the progressive representation is generated by concatenating the compressed binary codes corresponding to the first, second, third, and subsequent representations. In other embodiments, each separate compressed code (e.g., corresponding to the first, second, third, and subsequent representations) are individually transmitted to the client device 110.

At each sequential iteration, the sequential reconstruction module 280 may generate a subsequent representation that corresponds to the full original input image, or only a portion of the original input image. For example, in one embodiment, the sequential reconstruction module 280 considers every quadrant of the original input image. In other embodiments, the sequential reconstruction module 280 only considers quadrants of the original input image whose reconstruction error was above a given threshold during the previous iteration.

In various embodiments, the number of sequential iterations that are conducted in generating the compressed binary codes that correspond to the progressive representation may be determined by satisfying a criterion such as a threshold maximum of the combined size of the compressed binary codes. Another criterion may be when the generated difference falls below a maximum target reconstruction error. These criteria may be set depending on a target rate.

Referring back to FIG. 1, the decoder module 115 of the client device 110 receives the compressed binary codes. For example, if the received compressed binary codes correspond to different representations (e.g., the first, second, third, and subsequent representations), the decoder module 115 of the client device 110 decodes the first representation to obtain an initial reconstruction. Subsequently, the decoder module 115 decodes the second, third and subsequent representations in order to obtain the differences that can then be added to the initial reconstruction to improve the reconstruction quality.

Deployment Phase for a Video Content Input

In various embodiments, the input image 205 may be a video content with video frames. Therefore, the encoder module 140 properly encodes the video content to be sent to the client device 110. For example, during deployment, the feature extraction module 210 applies a frame predictor model that has been previously trained to predict a current video frame (e.g., coefficients and structures) based on the previous video frames. Thus, the feature extraction module 210 receives the predicted video frame and calculates a difference between the predicted video frame and the actual current video frame. The difference is hereafter referred to as a residual frame. The residual frame can undergo the appropriate compression process including decomposition by the bitplane decomposition module 220 and compression by the AAC module 225. Therefore, in various embodiments, the compressed residual frame, as opposed to the actual video frame, is provided to the client device 110. As the frame predictor model is trained over time, the residual is small and effectively compressed, thereby saving computational resources in comparison to compressing the actual video frame. The client device 110 receives the compressed residual frame and the decoder module 115 of the client device 110 appropriately decodes the residual frame for playback.

Encoding an Input Image by the DLBC System

Figure 6:
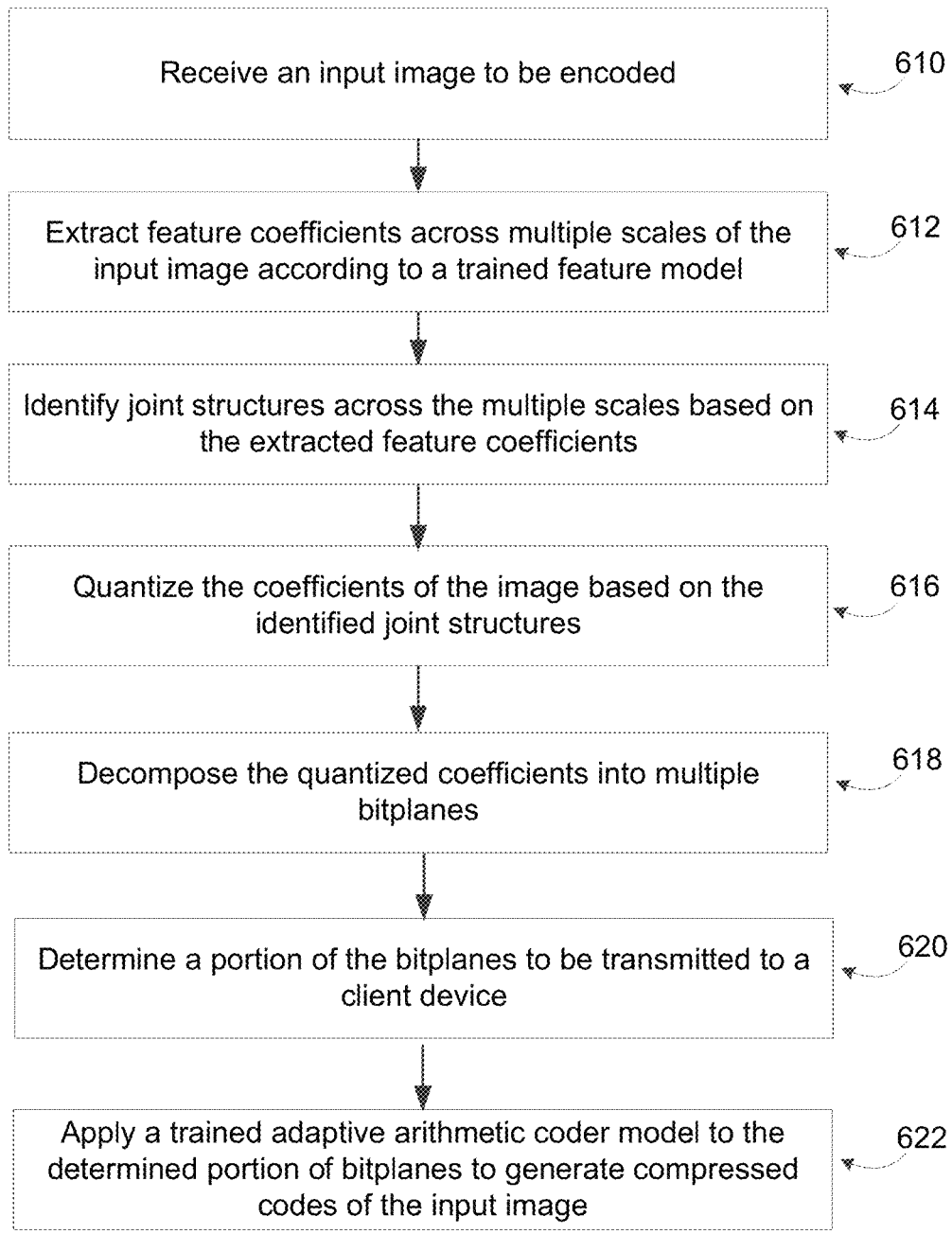
FIG. 6 is a flowchart for the generation of a compressed input image, in accordance with an embodiment.

FIG. 6 is a flowchart for the generation of a compressed encoding of an input image, in accordance with an embodiment. The DLBC system 130 receives 610 an input image that is to be encoded and sent to a client device 110. The DLBC system 130 extracts 612 feature coefficients across multiple scales of the input image based on a trained feature model. In various embodiments, the DLBC system 130 performs a pyramidal decomposition of the input image according to the trained feature model to extract features across multiple scales. For example, the trained feature model may determine how the multiple scales of the input image are generated. More specifically, the trained feature model may specify various downsampling operators that each downsamples the input image from a one scale to another scale.

The DLBC system 130 aligns the extracted feature coefficients and identifies 614 joint structures across the multiple scales based on the aligned coefficients. For example, the DLBC system 130 can apply a trained model that is trained to align the coefficients and to identify the structures across the scales. The DLBC system 130 quantizes 616 the aligned coefficients of the input image.

The DLBC system 130 decomposes 618 the quantized coefficients of the input image into multiple bitplanes according to a set precision of B bits. For example, each of the quantized coefficients is decomposed into B different bitplanes. As such, each bit of the B different bitplanes either has a value of 0 or 1. The DLBC system 130 may determine 620 a portion of the B different bitplanes to be transmitted to a client device 110. For example, the DLBC system 130 may generate a progressive representation of the input image that includes a portion of the bitplanes. The DLBC system 130 applies 622 a trained AAC model to the determined portion of bitplanes to generate compressed binary codes. For example, application of the trained AAC model predicts the probability of each bit given its context feature, thereby enabling the DLBC system 130 to compress the binary codes using arithmetic coding. This compressed code of the input image can then be sent to client devices 110.

Providing a Progressive Version of an Encoded Input Image

Figure 7:
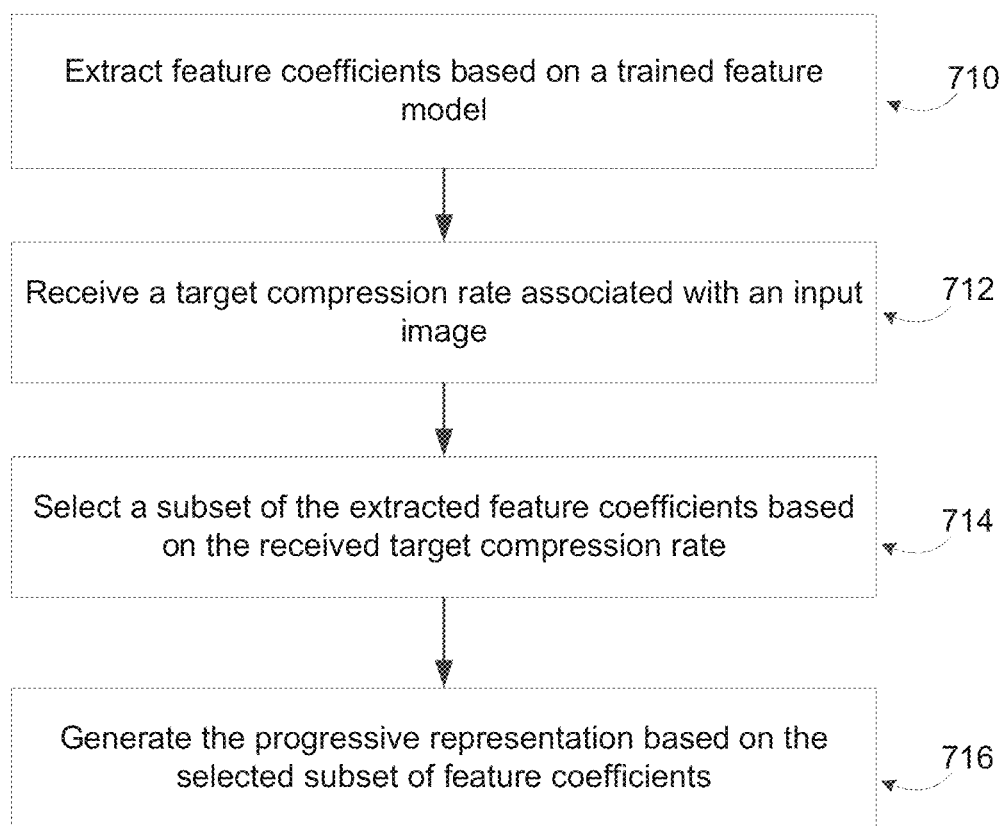
FIG. 7 is a flowchart for providing a progressive representation of an encoded input image to a client device, in accordance with an embodiment.

FIG. 7 is a flowchart for providing a progressive representation of an encoded input image to a client device, in accordance with an embodiment. The DLBC system 130 extracts 710 feature coefficients from an input image (or in the case of sequential reconstruction, a portion of the input image). As previously described, the DLBC system 130 may pyramidally decompose the input image across a number of scales and extract feature coefficients at each scale.

The DLBC system 130 further receives a target compression rate associated with the input image. In various embodiments, the target compression rate may be provided by a client device 110. As an example scenario, the DLBC system 130 may first provide a default version of an encoded input image to a client device 110. In response, the DLBC system 130 receives an indication of a target compression rate from the client device 110. In various embodiments, the target bitrate may be an optimal bitrate of the encoded input image that the client device 110 can handle based on available resources (e.g., bandwidth, computing resources, processing power).

Given the target compression rate, the DLBC system 130 selects 714 a subset of the extracted feature coefficients. The subset of extracted feature coefficients corresponds to the target compression rate. For example, the higher the target compression rate, the more feature coefficients are included in the subset.

The DLBC system 130 generates 716 the progressive representation of the input image based on the selected subset of extracted feature coefficients. For example, the selected subset of feature coefficients may correspond to channels and/or bitplanes of the decomposed quantized tensor ŷ. As such, the DLBC system 130 applies a zero-mask that is trained to truncate the representation of the input image at a particular location. As an example, the channels and/or bitplanes that correspond to the selected subset of feature coefficients are maintained. In various embodiments, all channels and/or bitplanes of the representation of the input image were previously ordered by a trained model according to an index associated with each channel and/or bitplane. As such, the channels and/or bitplanes that correspond to the selected subset of feature coefficients are indexed first and are therefore maintained when the trained zero-mask is applied.

Generating an Encoded Input Image with a Target Codelength

Figure 8:
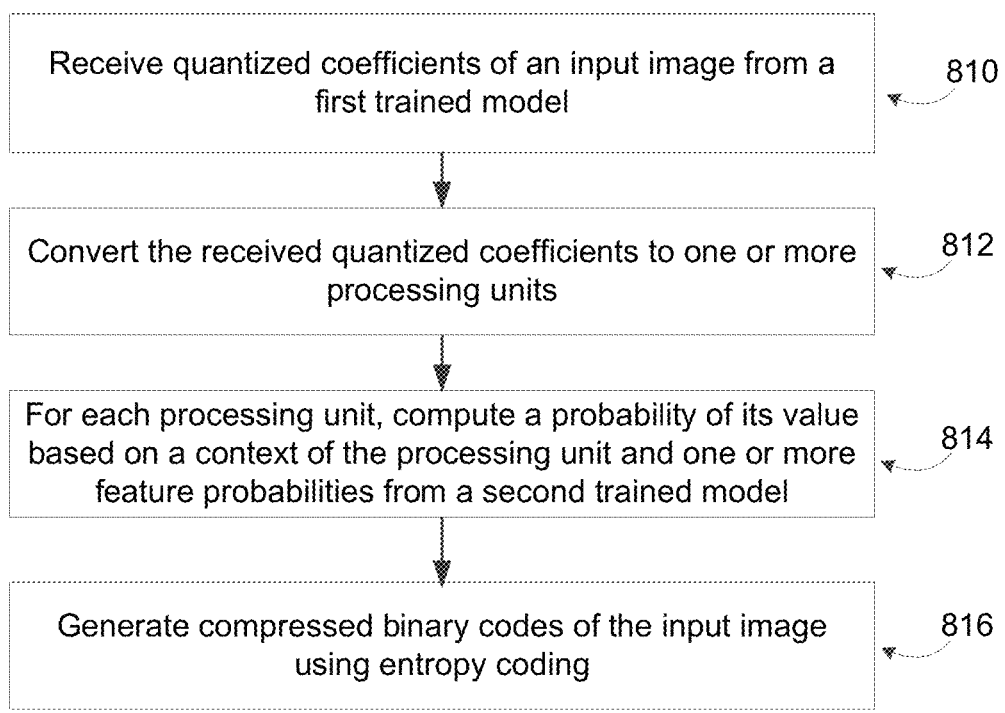
FIG. 8 is a flowchart for generating a compressed encoding of an input image with a target codelength, in accordance with an embodiment.

FIG. 8 is a flowchart for generating a compressed encoding of an input image with a target codelength, in accordance with an embodiment. The DLBC system 130 receives 810 quantized coefficients of an input image. In various embodiments, the quantized coefficients are provided by a first trained model that was previously trained to extract quantized coefficients that lead to improved compression. For example, during training, the first trained model may receive a training input image and as such, extract quantized coefficients from the training input image given a set of training parameters. The first trained model can compute a penalty for each extracted quantized coefficient and adjust the set of training parameters in order to minimize the computed penalties. Thus, if the first trained model were to receive the same training input image, the first trained model, when using the adjusted set of training parameters, would identify and extract quantized coefficients that would lead to an improved compression ratio. The first trained model can be iteratively trained over numerous training images during the training phase.

The DLBC system 130 converts 812 the received quantized coefficients into one or more processing units. A processing unit may be a single bit or it may refer to more than one bit. In various embodiments, the conversion process is a bitplane decomposition process that decomposes each quantized coefficient into bits on B bitplanes.

For each processing unit, the DLBC system 130 computes 814 a probability of the value of the processing unit. The DLBC system 130 may consider various factors in computing the probability including 1) a context of the processing unit and 2) feature probabilities that are received from a second trained model. Referring to the context of the processing unit, it may refer to values of previously encoded neighboring processing units and a channel index of the processing unit. If the processing unit is a single bit in a bitplane, the context may further include a bitplane index of the processing unit and values of co-located processing units that are on a different bitplane, but at the same location within the bitplane as the processing unit. Referring to the feature probabilities received from the second trained model, in various embodiments, the second trained model is trained during a training phase to predict feature probabilities. Namely, a feature probability represents the likelihood that a processing unit that is associated with a particular context feature has a certain value. Therefore, during deployment, the DLBC system 130 can map each context feature 410 to a probability 430 by looking up the probability of each feature based on the received feature probability.

The DLBC system 130 generates 816 compressed binary codes of the input image using entropy coding. As an example, the entropy coding is arithmetic coding that utilizes the computed probability of each processing unit.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving compressed code for an input image that encodes values of one or more processing units for a plurality of bitplanes;
obtaining a plurality of context features and a plurality of feature probabilities for the plurality of context features, wherein a context feature indicates a context of a processing unit, and a feature probability for a respective context feature indicates a likelihood a processing unit associated with the respective context feature has a non-zero value;
for each processing unit in the one or more processing units:
determining a context feature associated with the processing unit based on one or more previously decoded processing units;
decoding a value of the processing unit from the compressed code using a feature probability for the context feature associated with the processing unit;
generating a tensor for the input image based on the decoded values of the one or more processing units for the plurality of bitplanes; and
generating a reconstructed version of the input image applying a decoder portion of a neural network autoencoder to the tensor, wherein the decoder portion includes a trained set of parameters.

2. The computer-implemented method of claim 1, wherein the context of the processing unit comprises values of processing units neighboring the processing unit in the plurality of bitplanes.

3. The computer-implemented method of claim 1, wherein the context of the processing unit comprises an index of a corresponding channel of the processing unit.

4. The computer-implemented method of claim 1, wherein each bit in a bitplane of the plurality of bitplanes corresponds to a processing unit.

5. The computer-implemented method of claim 4, wherein the feature probability for the respective context feature indicates a likelihood the processing unit associated with the respective context feature has a value of 1.

6. The computer-implemented method of claim 4, wherein the context of the processing unit comprises a bitplane index of the processing unit.

7. The computer-implemented method of claim 4, wherein the context of the processing unit comprises whether co-located processing units associated with lower bitplane indices have non-zero values.

8. The computer-implemented method of claim 1, wherein the input image is a residual frame of a video predicted from a plurality of video frames of the video.

9. The computer-implemented method of claim 1, wherein the compressed code is obtained from an encoded tensor generated by applying an encoder portion of the neural network autoencoder to the input image.

10. The computer-implemented method of claim 1, wherein decoding the value of the processing unit further comprises performing arithmetic decoding on the compressed code using the feature probability for the context feature associated with the processing unit.

11. A non-transitory computer-readable storage medium including instructions that, when executed by a processor, cause the processor to perform steps including:
receiving compressed code for an input image that encodes values of one or more processing units for a plurality of bitplanes;

obtaining a plurality of context features and a plurality of feature probabilities for the plurality of context features, wherein a context feature indicates a context of a processing unit, and a feature probability for a respective context feature indicates a likelihood a processing unit associated with the respective context feature has a non-zero value;

for each processing unit in the one or more processing units:
  determining a context feature associated with the processing unit based on one or more previously decoded processing units;
  decoding a value of the processing unit from the compressed code using a feature probability for the context feature associated with the processing unit;

generating a tensor for the input image based on the decoded values of the one or more processing units for the plurality of bitplanes; and generating a reconstructed version of the input image applying a decoder portion of a neural network autoencoder to the tensor, wherein the decoder portion includes a trained set of parameters.

12. The non-transitory computer-readable storage medium of claim 11, wherein the context of the processing unit comprises values of processing units neighboring the processing unit in the plurality of bitplanes.

13. The non-transitory computer-readable storage medium of claim 11, wherein the context of the processing unit comprises an index of a corresponding channel of the processing unit.

14. The non-transitory computer-readable storage medium of claim 11, wherein each bit in a bitplane of the plurality of bitplanes corresponds to a processing unit.

15. The non-transitory computer-readable storage medium of claim 14, wherein the feature probability for the respective context feature indicates a likelihood the processing unit associated with the respective context feature has a value of 1.

16. The non-transitory computer-readable storage medium of claim 14, wherein the context of the processing unit comprises a bitplane index of the processing unit.

17. The non-transitory computer-readable storage medium of claim 14, wherein the context of the processing unit comprises whether co-located processing units associated with lower bitplane indices have non-zero values.

18. The non-transitory computer-readable storage medium of claim 11, wherein the input image is a residual frame of a video predicted from a plurality of video frames of the video.

19. The non-transitory computer-readable storage medium of claim 11, wherein the compressed code is obtained from an encoded tensor generated by applying an encoder portion of the neural network autoencoder to the input image.

20. The non-transitory computer-readable storage medium of claim 11, wherein decoding the value of the processing unit further comprises performing arithmetic decoding on the compressed code using the feature probability for the context feature associated with the processing unit.

* * * * *